United States Patent

Lu

(10) Patent No.: US 9,575,613 B2
(45) Date of Patent: Feb. 21, 2017

(54) TOUCH-SENSING APPARATUS, TOUCH SYSTEM, AND TOUCH-DETECTION METHOD

(71) Applicant: Wistron Corporation, New Taipei (TW)

(72) Inventor: Kuo-Hsien Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 118 days.

(21) Appl. No.: 14/588,990

(22) Filed: Jan. 5, 2015

(65) Prior Publication Data

US 2016/0085345 A1 Mar. 24, 2016

(30) Foreign Application Priority Data

Sep. 23, 2014 (TW) .............................. 103132834 A

(51) Int. Cl.
*G06F 3/041* (2006.01)
*G06F 3/046* (2006.01)
*G06F 3/043* (2006.01)

(52) U.S. Cl.
CPC .............. *G06F 3/046* (2013.01); *G06F 3/0433* (2013.01); *G06F 2203/04106* (2013.01)

(58) Field of Classification Search
CPC .......... G06F 3/042; G06F 3/044; G06F 3/045; G06F 3/046; G06F 2203/04106; G06F 3/043; G06F 3/0428; G06F 2203/04104; G06F 3/03545; G06F 3/0412; G06F 3/0421; G06F 3/0423; G06F 3/0433; G02F 1/13338; G06K 9/0002; H04N 5/33
See application file for complete search history.

(56) References Cited

U.S. PATENT DOCUMENTS 8,085,242 B2 * 12/2011 Endoh ................ G03G 15/5016
345/156
8,797,274 B2 * 8/2014 Challener ............. G06F 1/1616
345/156

(Continued)

FOREIGN PATENT DOCUMENTS

CN 101976158 2/2011
CN 103593093 2/2014

*Primary Examiner* — Andrew Sasinowski
*Assistant Examiner* — Gerald Oliver
(74) *Attorney, Agent, or Firm* — Jianq Chyun IP Office

(57) ABSTRACT

A touch-sensing apparatus includes a signal-receiving module and a control unit. The signal-receiving module includes a mechanical wave-receiving unit and an electromagnetic wave-receiving unit. The mechanical wave-receiving unit is configured to receive a mechanical wave signal actively emitted by a touch object. The electromagnetic wave-receiving unit, adjacent to the mechanical wave-receiving unit, is configured to receive an electromagnetic wave signal actively emitted by the touch object. The control unit is electrically connected to the mechanical wave-receiving unit and the electromagnetic wave-receiving unit, and decides an azimuth angle and a distance of the touch object on a sensing surface with respect to the signal-receiving module according to the electromagnetic wave signal and the mechanical wave signal, and decides a position of the touch object on the sensing surface according to the azimuth angle and the distance. A touch system and a touch-detection method are also provided.

31 Claims, 5 Drawing Sheets

(56) References Cited

U.S. PATENT DOCUMENTS

| | | | |
|---|---|---|---|
| 8,913,026 B2* | 12/2014 | Yoo | G06F 3/16 345/1.1 |
| 8,988,396 B2* | 3/2015 | Sarwar | G06F 3/016 345/177 |
| 2011/0242055 A1* | 10/2011 | Kim | G06F 3/042 345/175 |
| 2011/0316813 A1 | 12/2011 | Gu et al. | |
| 2012/0139878 A1* | 6/2012 | Tsang | G06F 3/0428 345/175 |
| 2013/0088465 A1* | 4/2013 | Geller | G06F 3/03545 345/179 |
| 2013/0172907 A1 | 7/2013 | Harris | |
| 2014/0354608 A1* | 12/2014 | Kitchens, II | G06F 1/3215 345/204 |
| 2015/0063068 A1* | 3/2015 | Yu | G01S 7/521 367/99 |
| 2015/0212653 A1* | 7/2015 | Cable | G06F 3/0423 345/175 |

* cited by examiner

TOUCH-SENSING APPARATUS, TOUCH SYSTEM, AND TOUCH-DETECTION METHOD

CROSS-REFERENCE TO RELATED APPLICATION

This application claims the priority benefit of Taiwan application serial no. 103132834, filed on Sep. 23, 2014. The entirety of the above-mentioned patent application is hereby incorporated by reference herein and made a part of this specification.

BACKGROUND OF THE INVENTION

Field of the Invention

The invention relates to a sensing apparatus, an electronic system, and a detection method, and more particularly, to a touch-sensing apparatus, a touch system, and a touch-detection method for detecting the position of a touch object operated on a sensing surface.

Description of Related Art

The conventional touch apparatus design today can generally be divided into, for instance, resistive, capacitive, optical, sound wave-type, and electromagnetic. The current optical touch apparatus often adopts infrared as the light source, and uses a charge-coupled device (CCD) or a complementary method oxide semiconductor (CMOS) optical sensor to sense infrared so as to calculate the position of a touch point.

A known optical touch apparatus emits infrared from an infrared light-emitting diode (LED), and the infrared is reflected by a touch object (such as a finger) and received by a light-sensing device, thereby calculating the position of the touch point of the touch object. However, a light-absorbing or scattering border is needed in the periphery of the touch region of such reflective optical touch apparatus so as to ensure a relatively high reflection brightness can be obtained after the infrared irradiates the touch object such that the infrared can be precisely received by the light-sensing device. Moreover, a light-emitting diode and a light-sensing device need to be respectively disposed in two corners (such as the top-left corner and the top-right corner) on the same side of the touch region in pairs. Moreover, a light-guide bar also needs to be disposed in the periphery of the touch region of a blocking optical touch apparatus, and a light-sensing device needs to be respectively disposed in two corners (such as the top-left corner and the top-right corner) on the same side of the touch region. Alternatively, infrared-emitting devices arranged in a row are disposed on a side of the touch region, and light-sensing devices corresponding to one another and arranged in a row are disposed on a corresponding side, and the position of the touch point of the touch object is calculated based on reduced intensity of the received light caused by blocking of the received light due to the touch object being in the touch region as sensed by the light-sensing device. In this way, the overall size of both the reflective and the blocking optical touch apparatuses is not readily reduced, such that the installation cost of the components and the apparatuses is high, and both the light-emitting devices and the light-sensing devices need to operate continuously. As a result, energy consumption of the optical touch apparatus cannot be effectively reduced.

SUMMARY OF THE INVENTION

The invention provides a touch-sensing apparatus having lower energy-consumption and smaller size.

The invention provides a touch system having lower energy-consumption and is suitable for application in any display apparatus.

The invention provides a touch-detection method capable of detecting the position of a touch object by a single sensing apparatus.

A touch-sensing apparatus according to the embodiment of the invention is installed in a periphery of a sensing surface and configured to sense a position of a touch object operated on the sensing surface. The touch-sensing apparatus includes a signal-receiving module and a control unit. The signal-receiving module includes a mechanical wave-receiving unit and an electromagnetic wave-receiving unit. The mechanical wave-receiving unit is configured to receive a mechanical wave signal actively emitted by a touch object. The electromagnetic wave-receiving unit, adjacent to the mechanical wave-receiving unit, is configured to receive an electromagnetic wave signal actively emitted by the touch object. The control unit is electrically connected to the mechanical wave-receiving unit and the electromagnetic wave-receiving unit, the control unit is configured to decide an azimuth angle of the touch object on the sensing surface with respect to the signal-receiving module according to the electromagnetic wave signal received by the electromagnetic wave-receiving unit, and the control unit is configured to decide a distance of the touch object on the sensing surface with respect to the signal-receiving module according to a time difference of the mechanical wave signal received by the mechanical wave-receiving unit and the electromagnetic wave signal received by the electromagnetic wave-receiving unit, and decide the position of the touch object on the sensing surface according to the azimuth angle and the distance.

A touch system according to the embodiment of the invention includes a touch object and the aforementioned touch-sensing apparatus. The touch object includes an electromagnetic wave source and a mechanical wave source. The electromagnetic wave source is configured to emit an electromagnetic wave signal and the mechanical wave source is configured to emit a mechanical wave signal, wherein the electromagnetic wave source is adjacent to the mechanical wave source.

A touch-detection method according to the embodiment of the invention includes receiving an electromagnetic wave signal from a touch object on a side of a sensing surface, deciding a position of the touch object according to the electromagnetic wave signal, receiving a mechanical wave signal from the touch object on a side of the sensing surface, and deciding a distance of the touch object according to a time difference of receiving the mechanical wave signal and receiving the electromagnetic wave signal.

In an embodiment of the invention, the control unit controls the on and off and a sampling frequency of the mechanical wave-receiving unit and the electromagnetic wave-receiving unit.

In an embodiment of the invention, the mechanical wave-receiving unit is turned on and starts to receive the mechanical wave signal after the electromagnetic wave-receiving unit receives the electromagnetic wave signal.

In an embodiment of the invention, the control unit is configured to control the electromagnetic wave-receiving unit to switch between a standby mode and a startup mode. A sampling frequency of the electromagnetic wave-receiving unit in the standby mode and a sampling frequency of the electromagnetic wave-receiving unit in the startup mode are different.

In an embodiment of the invention, the mechanical wave-receiving unit is an ultrasonic-receiving unit and the mechanical wave signal is an ultrasonic signal.

In an embodiment of the invention, the electromagnetic wave-receiving unit is an infrared-receiving unit and the electromagnetic wave signal is an infrared signal.

In an embodiment of the invention, the mechanical wave source is a plurality of mechanical wave sources and the mechanical wave sources surround the touch object.

In an embodiment of the invention, the touch object further includes a trigger terminal adjacent to the electromagnetic wave source and the mechanical wave source, and when the trigger terminal is pressed, the electromagnetic wave source emits an electromagnetic wave signal, and the mechanical wave source emits a mechanical wave signal at the same time.

Based on the above, the touch-sensing apparatus and the touch system provided in the embodiments of the invention can make the signal-sensing module sense the position of a touch object at a point on a sensing surface or at a point of the periphery of the sensing surface via the use of the mechanical wave-receiving unit and the electromagnetic wave-receiving unit. Moreover, with the sampling frequency setting of the mechanical wave-receiving unit and the electromagnetic wave-receiving unit, the touch-sensing apparatus and the touch system can further provide an energy-saving touch function. The touch-sensing apparatus and the touch system provided in the embodiments of the invention can readily be used with various display apparatuses and do not need to be confined to the limitation of a reflective bordered or borderless periphery of the display apparatus. The touch-detection method provided in the embodiments of the invention can detect the position of the touch object by the touch-sensing module, thus providing an energy-saving and simple touch function.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
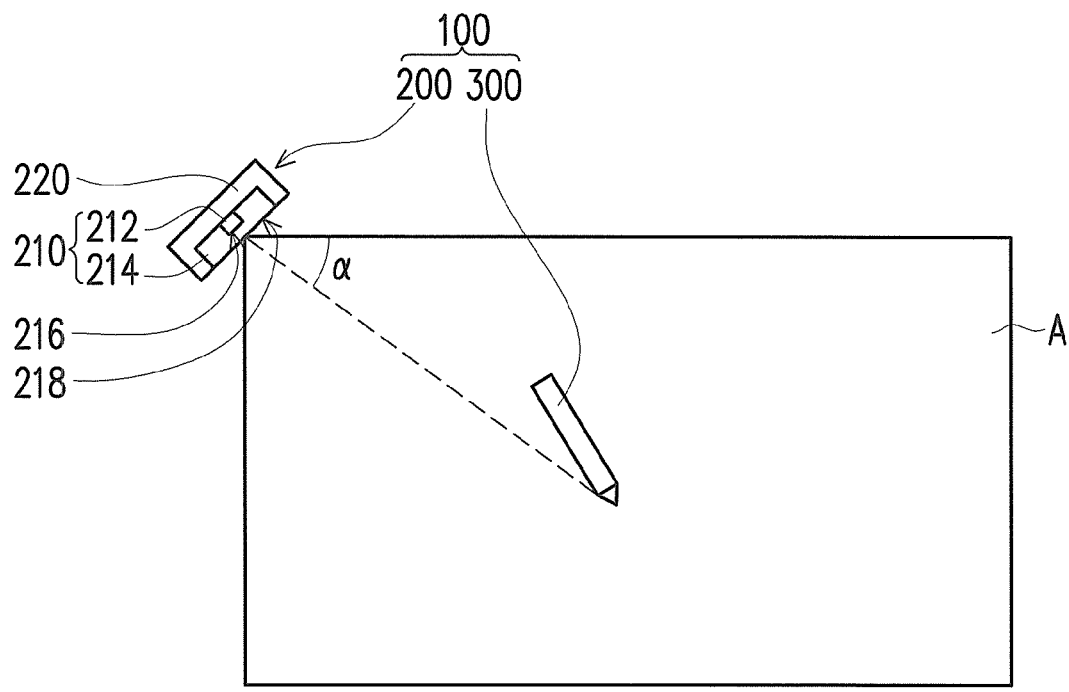
FIG. 1A is a top schematic view of a touch system in the first embodiment of the invention.
Figure 1B:
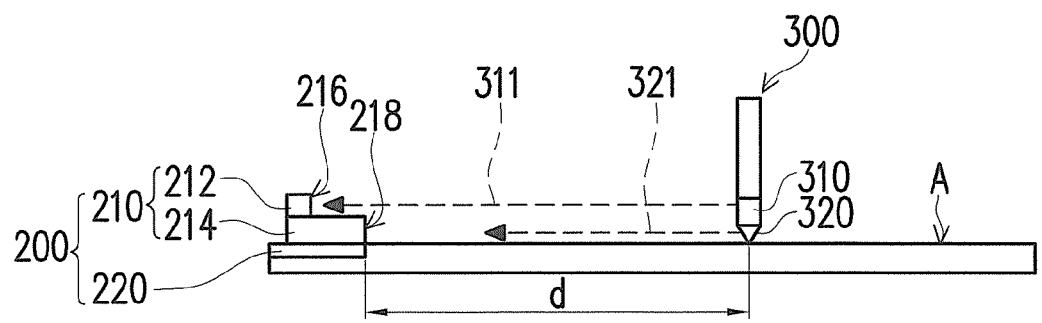
FIG. 1B is a side schematic view of a touch system in the first embodiment of the invention.

FIG. 1A is a top schematic view of a touch system in the first embodiment of the invention. FIG. 1B is a side schematic view of a touch system in the first embodiment of the invention. Referring to FIG. 1A and FIG. 1B, in an embodiment of the invention, a touch-sensing apparatus 200 is installed in a periphery of a sensing surface A and is configured to sense a position of a touch object 300 on the sensing surface A. In the present embodiment, the touch-sensing apparatus 200 includes a signal-receiving module 210 and a control unit 220. The signal-receiving module 210 includes a mechanical wave-receiving unit 212 and an electromagnetic wave-receiving unit 214. The mechanical wave-receiving unit 212 is configured to receive a mechanical wave signal 311 actively emitted by the touch object 300. The electromagnetic wave-receiving unit 214 is configured to receive an electromagnetic wave signal 321 actively emitted by the touch object 300, and the electromagnetic wave-receiving unit 214 is adjacent to the mechanical wave-receiving unit 212. The control unit 220 is electrically connected to the mechanical wave-receiving unit 212 and the electromagnetic wave-receiving unit 214, the control unit 220 is configured to decide an azimuth angle α of the touch object 300 on the sensing surface A with respect to the signal-receiving module 210 according to the electromagnetic wave signal 321 received by the electromagnetic wave-receiving unit 214, and the control unit 220 is configured to decide a distance d of the touch object 300 on the sensing surface A with respect to the signal-receiving module 210 according to a time difference of the mechanical wave signal 311 received by the mechanical wave-receiving unit 212 and the electromagnetic wave signal 321 received by the electromagnetic wave-receiving unit 214. The control unit 220 decides the position of the touch object 300 on the sensing surface A according to the azimuth angle α and the distance d.

Figure 1C:
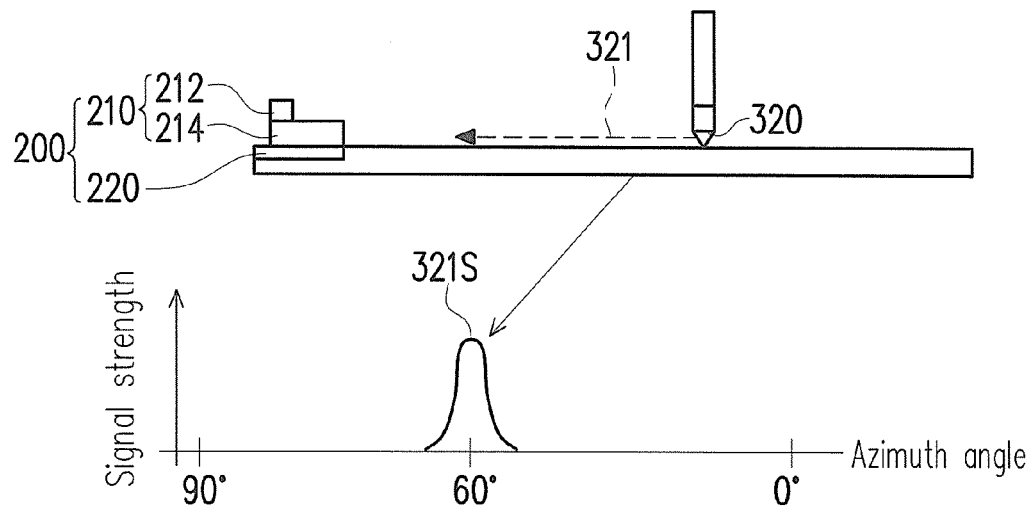
FIG. 1C is a schematic view of an electromagnetic wave-receiving unit in the first embodiment of the invention receiving an electromagnetic wave signal.

Referring to FIG. 1A and FIG. 1B, in the first embodiment of the invention, a touch system 100 includes the touch-sensing apparatus 200 and the touch object 300. The touch object 300 includes a mechanical wave source 310 and an electromagnetic wave source 320. The electromagnetic wave source 320 is configured to emit an electromagnetic wave signal 321 and the mechanical wave source 310 is configured to emit a mechanical wave signal 311, wherein the electromagnetic wave source 320 is adjacent to the mechanical wave source 310. In other words, in the touch system 100 of the present embodiment, the touch object 300 can actively emit an electromagnetic wave signal 321 and a mechanical wave signal 311 in the sensing surface A in synchrony, and the touch-sensing apparatus 200 receives the two signals. FIG. 1C is a schematic view of an electromagnetic wave-receiving unit in the first embodiment of the invention receiving an electromagnetic wave signal. Referring to FIG. 1A and FIG. 1C, in the present embodiment, the electromagnetic wave-receiving unit 214 can determine the azimuth angle α of the electromagnetic wave source 320 of the electromagnetic wave signal 321 with respect to the signal-receiving module 210 according to a detected electromagnetic wave sensing signal 321 S, and since the transmission speed of the electromagnetic wave signal 321 and the transmission speed of the mechanical wave signal 311 are different, the control unit 220 can determine the distance d of the touch object 300 with respect to the signal-receiving module 210 according to a time difference of the received time of the electromagnetic wave signal 321 and the mechanical wave signal 311 emitted by the touch object 300 in synchrony and respectively received by the signal-receiving module 210. In the present embodiment, the electromagnetic wave-receiving unit 214 is, for instance, a linear array receiving unit, and therefore can identify the azimuth angle α of the electromagnetic wave source 320 emitting the electromagnetic wave signal 321 with respect to the signal-receiving module 210.

Figure 1D:
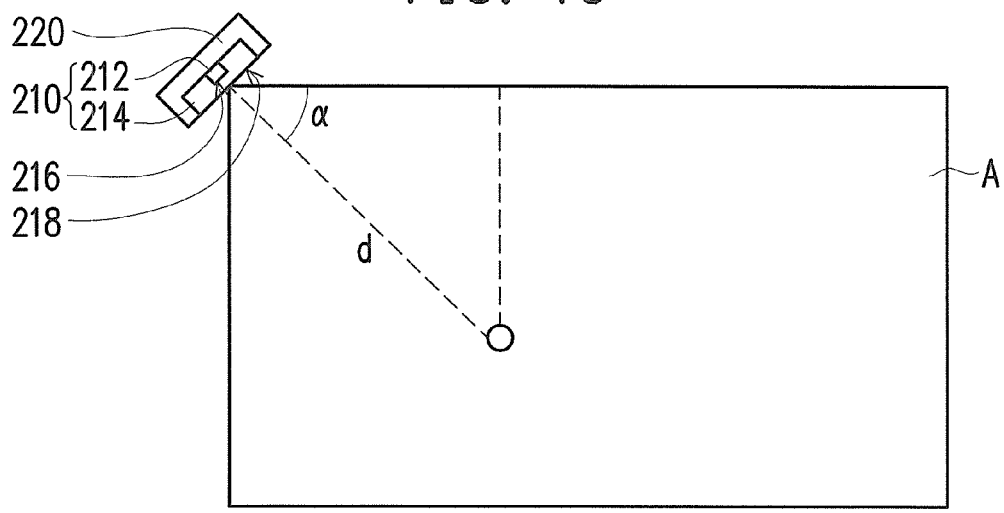
FIG. 1D is a schematic view of a touch system in the first embodiment of the invention determining the position of a touch object.

FIG. 1D is a schematic view of a touch system in the first embodiment of the invention determining the position of a touch object. Referring to FIG. 1A and FIG. 1D, according to the azimuth angle α and the distance d, the control unit 220 in the first embodiment of the invention can decide the position of the touch object 300 on the sensing surface A via, for instance, a method of polar coordinates, or convert the azimuth angle α and the distance d into Cartesian coordinates of the touch object 300 with respect to the sensing surface A. In the first embodiment of the invention, the touch-sensing apparatus 200 only needs to be disposed in a single corner adjacent to the sensing surface A, and can detect the position of the touch object 300 on the sensing surface A without an additional light-absorbing edge strip, a light-guide bar, and a sensing apparatus or signal-emitting source disposed in other corners. Therefore, not only is the touch system 100 including the touch-sensing apparatus 200 small in size and lightweight, an additional component is also not needed for the sensing surface A. Therefore, the embodiment of the invention can be directly applied in an existing electronic whiteboard or a display apparatus. Alternatively, a borderless touch display apparatus can be designed.

Referring to FIG. 1A, in the first embodiment of the invention, the mechanical wave-receiving unit 212 includes a mechanical wave-receiving terminal 216, the electromagnetic wave-receiving unit 214 includes an electromagnetic wave-receiving terminal 218, the mechanical wave-receiving terminal 216 is disposed adjacent to the electromagnetic wave-receiving terminal 218, and both the mechanical wave-receiving terminal 216 and the electromagnetic wave-receiving terminal 218 face the sensing surface A and face the same direction. The mechanical wave-receiving terminal 216 and the electromagnetic wave-receiving terminal 218 are configured to receive the electromagnetic wave signal 321 and the mechanical wave signal 311 from the sensing surface A. In other words, in the present embodiment, the mechanical wave-receiving unit 212 and the electromagnetic wave-receiving unit 214 both face the sensing surface A in the same direction. As a result, the time difference of transmission of the electromagnetic wave signal 321 and the mechanical wave signal 311 to the signal-receiving module 210 can be accurately detected.

Referring to FIG. 1A and FIG. 1B, in an embodiment of the invention, the control unit 220 controls the on and off and a sampling frequency of the mechanical wave-receiving unit 212 and the electromagnetic wave-receiving unit 214, thereby reducing energy-consumption. Specifically, in the present embodiment, the mechanical wave-receiving unit 212 can be turned on (or waken) and start to receive the mechanical wave signal 311 after the electromagnetic wave-receiving unit 214 receives the electromagnetic wave signal 321. Therefore, in the present embodiment, the mechanical wave-receiving unit 212 and the electromagnetic wave-receiving unit 214 do not need to be continuously operated over a long period of time, wherein the electromagnetic wave-receiving unit 214 detects the electromagnetic wave signal 321 with a fixed sampling frequency, and the mechanical wave-receiving unit 212 does not need to be started (or waken) before the electromagnetic wave-receiving unit 214 receives the electromagnetic wave signal 321. Therefore, the touch system 100 of the present embodiment can provide a low energy-consuming touch function.

More specifically, referring to FIG. 1A and FIG. 1B, the control unit 220 is configured to control the electromagnetic wave-receiving unit 214 to switch between a standby mode and a startup mode. The sampling frequency of the electromagnetic wave-receiving unit 214 in the standby mode and the sampling frequency of the electromagnetic wave-receiving unit 214 in the startup mode are different. In other words, in the present embodiment, the electromagnetic wave-receiving unit 214 can sense the sensing surface A in the standby mode with a sampling frequency lower than that of the startup mode, thus providing better energy-saving efficacy.

Figure 1E:
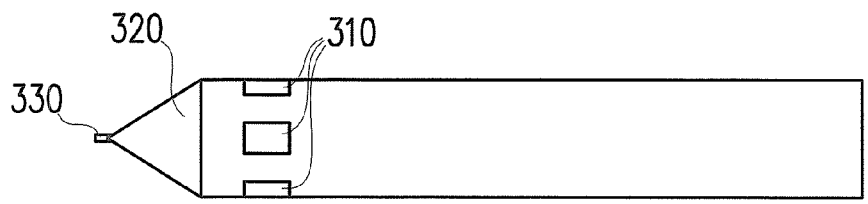
FIG. 1E is a schematic view of a touch object in the first embodiment of the invention.

FIG. 1E is a schematic view of a touch object in the first embodiment of the invention. Specifically, in the present embodiment, the touch object 300 is configured to operate on the sensing surface A, and the touch object 300 further includes a trigger terminal 330 disposed adjacent to the electromagnetic wave source 320 and the mechanical wave source 310. However, in other embodiments, the trigger terminal 330 can also be disposed in a place not adjacent to the electromagnetic wave source 320 and the mechanical wave source 310. When the trigger terminal 330 is pressed, the electromagnetic wave source 320 emits the electromagnetic wave signal 321, and the mechanical wave source 310 emits the mechanical wave signal 311 at the same time. However, the invention is not limited thereto, and in other embodiments, the time difference of signal emission of the electromagnetic wave source 320 and the mechanical wave source 310 can further be adjusted as needed. In the present embodiment, the mechanical wave source 310 is a plurality of mechanical wave sources 310 and the mechanical wave sources 310 surround the touch object 300. More specifically, in the present embodiment, the mechanical wave sources 310, for instance, emit the mechanical wave signal 311 at an emission angle of 15 degrees, and by surrounding the touch object 300, transmission of the mechanical wave signal 311 emitted by the mechanical wave sources 310 in all directions of the touch object 300 can be ensured, such that even in the case that the touch object 300 is in a rotation operation, all of the mechanical wave-receiving units 212 can receive the entire mechanical wave signal 311. In other words, when the sensing surface A of the touch system 100 is located on a display screen, when the touch object 300 is, for instance, pressed on the display screen, the touch object 300 emits the mechanical wave signal 311 and the electromagnetic wave signal 321 to the touch-sensing apparatus 200 located adjacent to the sensing surface A at the same time. More specifically, in the present embodiment, when the electromagnetic wave-receiving unit 214 is in the standby mode, the electromagnetic wave signal 321 emitted by the touch object 300 can be used as a startup electromagnetic wave signal, and after the electromagnetic wave-receiving unit 214 receives the startup electromagnetic wave signal, the electromagnetic wave-receiving unit 214 is switched from a standby mode to a startup mode, wherein a sampling frequency of the electromagnetic wave-receiving unit 214 in the standby mode and a sampling frequency of the electromagnetic wave-receiving unit 214 in the startup mode are different. In other words, the electromagnetic wave signal 321 emitted by the touch object 300 can also make the signal-receiving module 210 switch from a standby mode to a startup mode to reduce energy-consumption.

Moreover, referring to FIG. 1A and FIG. 1B, in the present embodiment, the control unit 220 increases the accuracy of the determination of the position of the touch object 300 according to a time difference between receiving the mechanical wave signal 311 and receiving the electromagnetic wave signal 321. In the present embodiment, the control unit 220 decides the azimuth angle α and the distance d of the touch object 300 within a sensing surface A with respect to the signal-receiving module 210. When the touch object 300 emits the mechanical wave signal 311 and the electromagnetic wave signal 321 outside the sensing surface A, the control unit 220 does not decide the azimuth angle α and the distance d of the touch object 300 with respect to the signal-receiving module 210 according to the mechanical wave signal 311 and the electromagnetic wave signal 321.

Figure 2A:
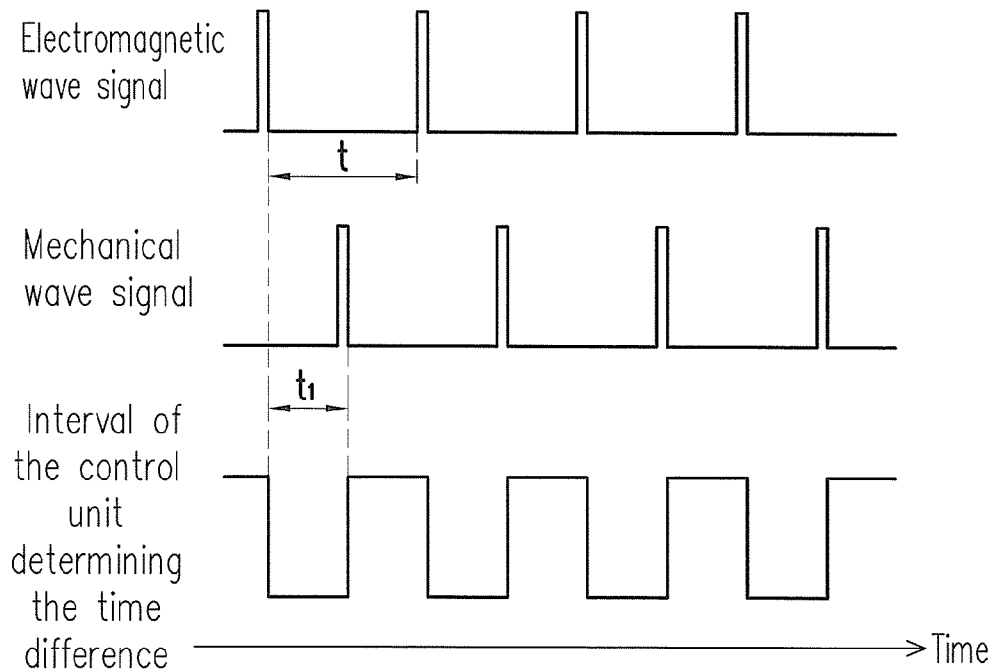
FIG. 2A and FIG. 2B are schematic views of an electromagnetic wave signal and a mechanical wave signal sensed by a touch-sensing apparatus in the first embodiment of the invention, and a control unit of the touch-sensing apparatus determining a time difference.
Figure 2B:
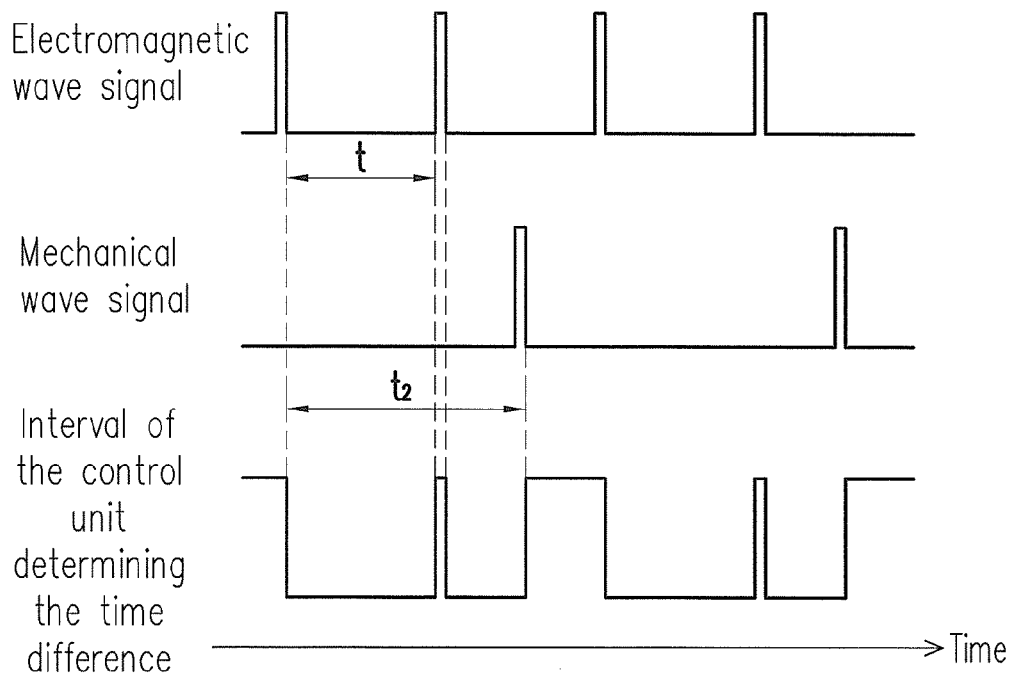

FIG. 2A and FIG. 2B are schematic views of an electromagnetic wave signal and a mechanical wave signal sensed by a touch-sensing apparatus in the first embodiment of the invention, and a control unit of the touch-sensing apparatus determining a time difference. Specifically, referring to FIG. 1A and FIG. 2A, in the present embodiment, the control unit 220 compares a time difference $t_1$ of receiving the mechanical wave signal 311 and receiving the electromagnetic wave signal 321 with a determination time t, and the determination time t is substantially a time needed to transmit the mechanical wave signal 311 from the farthest position in the sensing surface A with respect to the signal-receiving module 210 to the signal-receiving module 210. When the time difference $t_1$ is less than the determination time t, the control unit 220 converts the time difference $t_1$ into the distance d of the touch object 300 with respect to the signal-receiving module 210 according to the determination time t, and then obtains the position of the touch object 300 with the azimuth angle α. Referring to FIG. 2B, when a time difference $t_2$ is greater than the determination time t (i.e., the touch object 300 is beyond the sensing surface A), the control unit 220 does not decide the azimuth angle and the distance of the touch object 300 with respect to the signal-receiving module 210 according to the mechanical wave signal 311 and the electromagnetic wave signal 321. Therefore, not only can the touch-sensing apparatus in the present embodiment sense the position of the touch object 300, the touch-sensing apparatus can also prevent a false positive caused when the touch object 300 emits a signal outside the sensing surface A, thus increasing touch accuracy. In other embodiments of the invention, the determination time t is not limited to the time needed to transmit the mechanical wave signal 311 from the farthest position in the sensing surface A with respect to the signal-receiving module 210 to the signal-receiving module 210. If needed, the determination time t can also be adjusted to be over the time needed to transmit the mechanical wave signal 311 from a position beyond the farthest position in the sensing surface A with respect to the signal-receiving module 210 to the signal-receiving module 210.

In the first embodiment of the invention, the mechanical wave-receiving unit 212 is, for instance, an ultrasonic-receiving unit and the mechanical wave signal 311 is, for instance, an ultrasonic signal. However, the invention is not limited thereto. In the present embodiment, the electromagnetic wave-receiving unit 214 is, for instance, an infrared-receiving unit and the electromagnetic wave signal 321 is, for instance, an infrared signal. However, the invention is not limited thereto. In other embodiments of the invention, the touch-sensing apparatus can use an electromagnetic wave and a mechanical wave of other suitable wave bands as the main wave band of the electromagnetic wave signal and mechanical wave signal.

Figure 3:
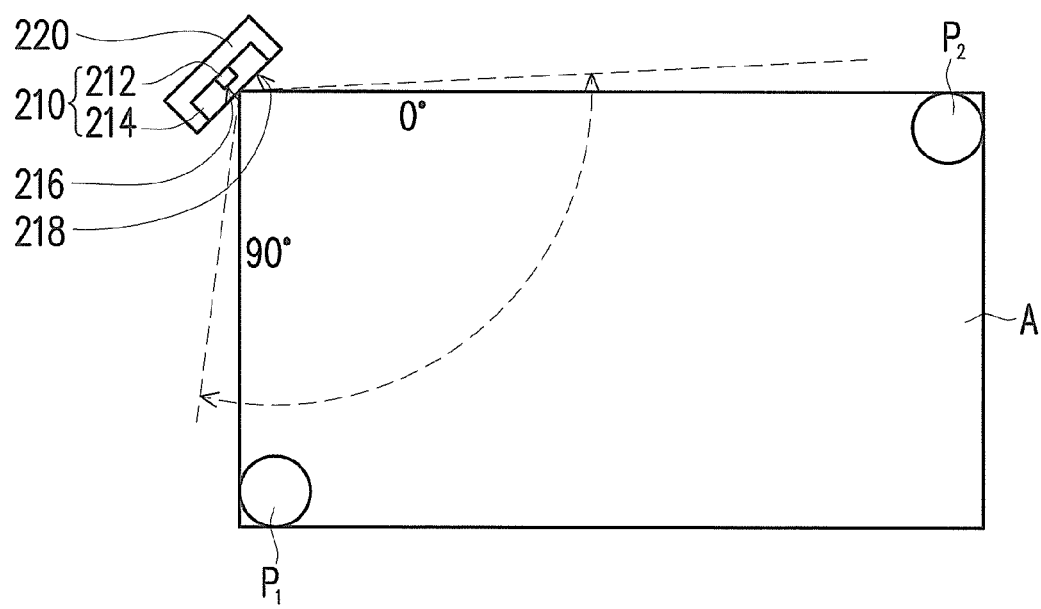
FIG. 3 is a schematic view of correcting the touch system in the first embodiment of the invention.

FIG. 3 is a schematic view of correcting the touch system in the first embodiment of the invention. Referring to FIG. 3, in the present embodiment, the control unit 220 can further correct the touch-sensing apparatus via the mechanical wave signal and the electromagnetic wave signal emitted by the touch object 300 from each of a first correction position $P_1$ and a second correction position $P_2$. In other words, the azimuth angle and the distance of the first correction position $P_1$ and the second correction position $P_2$ with respect to the signal-receiving module 210 are both known, and therefore the signal-receiving module 210 can correct the numerical value of the azimuth angle and the distance determined by the control unit according to the mechanical wave signal and the electromagnetic wave signal from the first correction position $P_1$ and the second correction position $P_2$, thereby increasing the accuracy of touch-sensing function.

Figure 4:
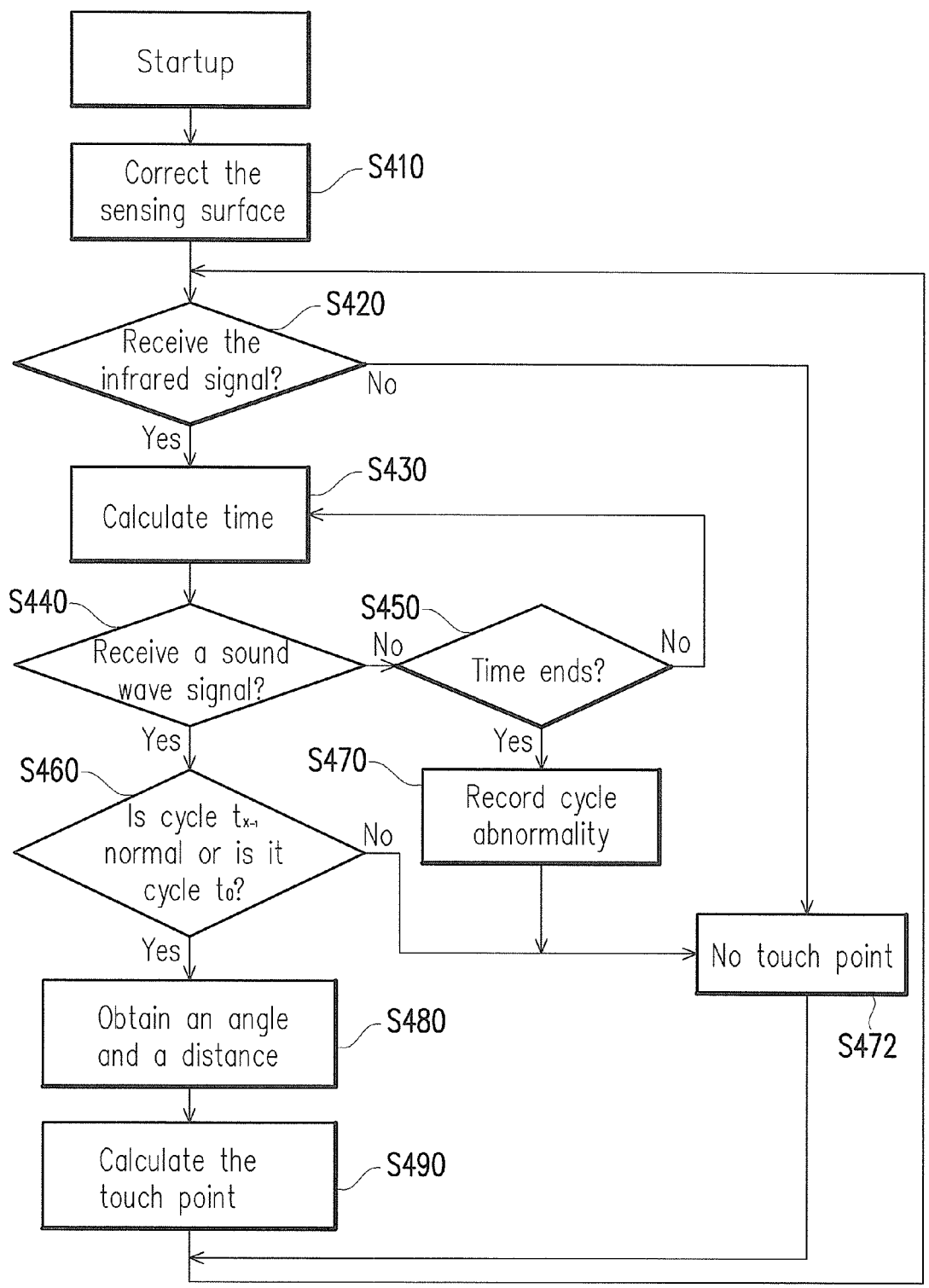
FIG. 4 is a flow chart of a touch-detection method of the second embodiment of the invention.

Since both the touch system and the touch-sensing apparatus can be applied in the following touch-detection method to sense the position of the touch object 300 operated on the sensing surface A, the touch-detection method provided in the embodiment of the invention is described in the following with the touch system. FIG. 4 is a flow chart of a touch-detection method of the second embodiment of the invention.

Referring to FIG. 1 and FIG. 4, in the second embodiment of the invention, the touch-detection method includes receiving an electromagnetic wave signal 321 actively emitted by a touch object 300 throuth the touch-sensing apparatus 200, deciding an azimuth angle of the touch object 300 with respect to the sensing surface A according to the electromagnetic wave signal 321, receiving a mechanical wave signal 311 actively emitted by the touch object 300 through the touch-sensing apparatus 200, and deciding a distance of the touch object 300 according to a time difference of the reception of the mechanical wave signal 311 and the reception of the electromagnetic wave signal 321. The position of the touch object 300 on the sensing surface A is decided according to the azimuth angle and the distance.

More specifically, referring to FIG. 4, in the second embodiment of the invention, the electromagnetic wave signal 321 is exemplified as an infrared signal and the mechanical wave signal 311 is exemplified as a sound wave signal. Moreover, the azimuth of the touch object 300 is, for instance, represented by the azimuth angle of the signal-receiving module 210 with respect to the touch object 300. However, the invention is not limited thereto. In other embodiments, the azimuth of the touch object can further be divided and defined as a plurality of azimuth regions as needed. Therefore, in the second embodiment of the invention, the touch-detection method includes, for instance, a step in which an infrared signal is received S420, calculating a time S430 before receiving a sound wave signal S440, then obtaining an angle and a distance according to the infrared signal and the sound wave signal S480, and then calculating a touch point S490.

Referring to FIG. 3 and FIG. 4, the second embodiment of the invention further includes, before the step in which a side of the sensing surface A receives the electromagnetic wave signal 321 from the touch object 300, for instance, a step in which the sensing surface is corrected S410, including making the touch object 300 emits a correction mechanical wave signal and a correction electromagnetic wave signal from each of two different positions $P_1$ and $P_2$ on the sensing surface A and receive the correction mechanical wave signal and the correction electromagnetic wave signal to correct the sensing surface A. In the present embodiment, the correction positions $P_1$ and $P_2$ having the greatest azimuth angle and the smallest azimuth angle on the sensing surface A with respect to the signal-receiving module 210 are used. However, the invention is not limited thereto.

Referring to FIG. 1 and FIG. 4, the second embodiment of the invention further includes, after the electromagnetic wave signal and the mechanical wave signal emitted from the touch object 300 at the same time are received at a side of the sensing surface A, comparing the time of the mechanical wave-receiving unit receiving the mechanical wave signal, that is, in the case that the sound wave signal is received and a touch point is detected in the previous detection cycle (i.e., cycle $t_{x-1}$), or the current detection cycle is the first detection cycle (i.e., cycle $t_0$), then an angle and a distance are obtained S480 as above. In the case that a sound wave signal is not received S440, whether the calculated time S430 exceeds a determination time is determined. In the case that the time of the mechanical wave-receiving unit receiving the mechanical wave signal reaches the determination time, the time is regarded as ended S450, and abnormality of the current cycle is recorded S470, and no touch point is recorded at the same time S472. Then, the electromagnetic wave signal emitted by the touch object 300 is received again. In the next detection cycle, since the current detection cycle is no touch point S472, if a sound wave signal is received before the time ends, the next detection cycle is still determined to be no touch point S472 due to the record that the current cycle (i.e., cycle $t_{x-1}$) is no touch point S472, so as to prevent a false positive formed from the touch object 300 being beyond the sensing surface A.

Referring to FIG. 1 and FIG. 4, the second embodiment of the invention further includes, before the touch object 300 emits the electromagnetic wave signal and the mechanical wave signal on the sensing surface A, making the touch object 300 emit a startup electromagnetic wave signal on the sensing surface A, and after the electromagnetic wave-receiving unit 214 receives the startup electromagnetic wave signal, the electromagnetic wave-receiving unit 214 is switched from a standby mode to a startup mode, wherein a sampling frequency of the electromagnetic wave-receiving unit 214 in the standby mode and a sampling frequency of the electromagnetic wave-receiving unit 214 in the startup mode are different.

Referring to FIG. 4, the second embodiment of the invention further includes, for instance, a step in which a touch point is calculated, including calculating Cartesian coordinates of the touch object 300 corresponding to the sensing surface A through a control unit 220 according to the azimuth and the distance of the touch object 300.

Based on the above, the touch-sensing apparatus and the touch system provided in the embodiments of the invention can be integrated into a single module of a mechanical wave-receiving unit and an electromagnetic wave-receiving unit to sense the position of a touch object on a sensing surface, wherein the signal-sensing module can sense the position of a touch object at a point on a sensing surface or at a point in the periphery of the sensing surface, and does not need to occupy additional space or be used with other optical devices, thus reducing the needed size. At the same time, the touch-sensing apparatus and the touch system provided in the embodiments of the invention are used in conjunction with the sampling frequency setting of the mechanical wave-receiving unit and the electromagnetic wave-receiving unit, and the touch-sensing apparatus and the touch system can further provide an energy-saving touch function. The touch-sensing apparatus and the touch system provided in the embodiments of the invention can readily be used with various display apparatuses and do not need to be confined to the limitation of a bordered or borderless periphery of the display apparatus. The touch-detection method provided in the embodiments of the invention can detect the position of the touch object through the touch-sensing module, thus providing an energy-saving and simple touch function.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A touch-sensing apparatus, installed in a periphery of a sensing surface and configured to sense a position of a touch object operated on the sensing surface, the touch-sensing apparatus comprising:
   a signal-receiving module, comprising:
      a mechanical wave-receiving unit configured to receive a mechanical wave signal actively emitted by the touch object; and
      an electromagnetic wave-receiving unit adjacent to the mechanical wave-receiving unit and configured to receive an electromagnetic wave signal actively emitted by the touch object; and
   a control unit electrically connected to the mechanical wave-receiving unit and the electromagnetic wave-receiving unit and configured to decide an azimuth angle of the touch object on the sensing surface with respect to the signal-receiving module according to the electromagnetic wave signal received by the electromagnetic wave-receiving unit, decide a distance of the touch object on the sensing surface with respect to the signal-receiving module according to a time difference between time of the mechanical wave signal being received by the mechanical wave-receiving unit and time of the electromagnetic wave signal being received by the electromagnetic wave-receiving unit, and decide the position of the touch object on the sensing surface according to the azimuth angle and the distance.

2. The touch-sensing apparatus of claim 1, wherein the control unit controls an on and off and a sampling frequency of the mechanical wave-receiving unit and the electromagnetic wave-receiving unit.

3. The touch-sensing apparatus of claim 2, wherein the mechanical wave-receiving unit is turned on and starts to receive the mechanical wave signal after the electromagnetic wave-receiving unit receives the electromagnetic wave signal.

4. The touch-sensing apparatus of claim 2, wherein the control unit is configured to control the electromagnetic wave-receiving unit to switch between a standby mode and a startup mode, and a sampling frequency of the electromagnetic wave-receiving unit in the standby mode and a sampling frequency of the electromagnetic wave-receiving unit in the startup mode are different.

5. The touch-sensing apparatus of claim 1, wherein the control unit decides an azimuth angle and a distance of the touch object within the sensing surface with respect to the signal-receiving module, and when the touch object emits the mechanical wave signal and the electromagnetic wave signal outside the sensing surface, the control unit does not decide the azimuth angle and the distance of the touch object with respect to the signal-receiving module according to the mechanical wave signal and the electromagnetic wave signal.

6. The touch-sensing apparatus of claim 5, wherein the control unit compares a time difference of receiving the mechanical wave signal and receiving the electromagnetic wave signal with a determination time, the determination time is substantially a time needed to transmit the mechanical wave signal from a farthest position in the sensing surface with respect to the signal-receiving module to the signal-receiving module, and when the time difference is greater than the determination time, the control unit does not decide the azimuth angle and the distance of the touch object with respect to the signal-receiving module according to the mechanical wave signal and the electromagnetic wave signal.

7. The touch-sensing apparatus of claim 1, wherein the touch object emits the mechanical wave signal and the electromagnetic wave signal in synchrony.

8. The touch-sensing apparatus of claim 1, wherein the mechanical wave-receiving unit comprises a mechanical wave-receiving terminal, the electromagnetic wave-receiving unit comprises an electromagnetic wave-receiving terminal, the mechanical wave-receiving terminal is disposed adjacent to the electromagnetic wave-receiving terminal, and both the mechanical wave-receiving terminal and the electromagnetic wave-receiving terminal face the sensing surface and face a same direction, and the mechanical wave-receiving terminal and the electromagnetic wave-receiving terminal are configured to respectively receive the electromagnetic wave signal and the mechanical wave signal emitted by the touch object operated on the sensing surface.

9. The touch-sensing apparatus of claim 1, wherein the mechanical wave-receiving unit is an ultrasonic-receiving unit and the mechanical wave signal is an ultrasonic signal.

10. The touch-sensing apparatus of claim 1, wherein the electromagnetic wave-receiving unit is an infrared-receiving unit and the electromagnetic wave signal is an infrared signal.

11. The touch-sensing apparatus of claim 1, wherein the electromagnetic wave-receiving unit is a linear array receiving unit.

12. A touch system, comprising:
a touch object configured to operate on a sensing surface, comprising:
an electromagnetic wave source configured to actively emit an electromagnetic wave signal; and
a mechanical wave source configured to actively emit a mechanical wave signal, wherein the electromagnetic wave source is adjacent to the mechanical wave source;
a touch-sensing apparatus installed in a periphery of the sensing surface and configured to sense a position of the touch object on the sensing surface, the touch-sensing apparatus comprising:
a signal-receiving module, comprising:
a mechanical wave-receiving unit configured to receive the mechanical wave signal; and
an electromagnetic wave-receiving unit adjacent to the mechanical wave-receiving unit and configured to receive the electromagnetic wave signal; and
a control unit electrically connected to the mechanical wave-receiving unit and the electromagnetic wave-receiving unit and configured to decide an azimuth angle of the touch object on the sensing surface with respect to the signal-receiving module according to the electromagnetic wave signal received by the electromagnetic wave-receiving unit, decide a distance of the touch object on the sensing surface with respect to the signal-receiving module according to a time difference between time of the mechanical wave signal being received by the mechanical wave-receiving unit and time of the electromagnetic wave signal being received by the electromagnetic wave-receiving unit, and decide the position of the touch object on the sensing surface via the azimuth angle and the distance.

13. The touch system of claim 12, wherein the control unit controls an on and off and a sampling frequency of the mechanical wave-receiving unit and the electromagnetic wave-receiving unit.

14. The touch system of claim 12, wherein the mechanical wave-receiving unit is turned on and starts to receive the mechanical wave signal after the electromagnetic wave-receiving unit receives the electromagnetic wave signal.

15. The touch system of claim 12, wherein the control unit is configured to control the electromagnetic wave-receiving unit to switch between a standby mode and a startup mode, and a sampling frequency of the electromagnetic wave-receiving unit in the standby mode and a sampling frequency of the electromagnetic wave-receiving unit in the startup mode are different.

16. The touch system of claim 12, wherein the control unit decides an azimuth angle and a distance of the touch object within the sensing surface with respect to the signal-receiving module, and when the touch object emits the mechanical wave signal and the electromagnetic wave signal outside the sensing surface, the control unit does not decide the azimuth angle and the distance of the touch object with respect to the signal-receiving module according to the mechanical wave signal and the electromagnetic wave signal.

17. The touch system of claim 16, wherein the control unit compares a time difference of receiving the mechanical wave signal and receiving the electromagnetic wave signal with a determination time, the determination time is substantially a time needed to transmit the mechanical wave signal from a farthest position in the sensing surface with respect to the signal-receiving module to the signal-receiving module, and when the time difference is greater than the determination time, the control unit does not decide the azimuth angle and the distance of the touch object with respect to the signal-receiving module according to the mechanical wave signal and the electromagnetic wave signal.

18. The touch system of claim 16, wherein the touch object emits the mechanical wave signal and the electromagnetic wave signal in synchrony.

19. The touch system of claim 12, wherein the mechanical wave-receiving unit comprises a mechanical wave-receiving terminal, the electromagnetic wave-receiving unit comprises an electromagnetic wave-receiving terminal, the mechanical wave-receiving terminal is disposed adjacent to the electromagnetic wave-receiving terminal, and both the mechanical wave-receiving terminal and the electromagnetic wave-receiving terminal face the sensing surface and face a same direction, and the mechanical wave-receiving terminal and the electromagnetic wave-receiving terminal are configured to respectively receive the electromagnetic wave signal and the mechanical wave signal emitted by the touch object operated on the sensing surface.

20. The touch system of claim 12, wherein the mechanical wave signal is an ultrasonic signal and the mechanical wave-receiving unit is an ultrasonic-receiving unit.

21. The touch system of claim 12, wherein the electromagnetic wave signal is an infrared signal and the electromagnetic wave-receiving unit is an infrared-receiving unit.

22. The touch system of claim 12, wherein the electromagnetic wave-receiving unit is a linear array receiving unit.

23. The touch system of claim 12, wherein the mechanical wave source is a plurality of mechanical wave sources, and the mechanical wave sources surround the touch object.

24. The touch system of claim 12, wherein the touch object further comprises a trigger terminal, and when the trigger terminal is pressed, the electromagnetic wave source emits the electromagnetic wave signal, and the mechanical wave source emits the mechanical wave signal at the same time.

25. A touch-detection method, suitable for sensing a position of a touch object operated on a sensing surface, and a touch-sensing apparatus is disposed in a periphery of the sensing surface, the touch-detection method comprising:
 receiving an electromagnetic wave signal actively emitted from the touch object by the touch-sensing apparatus and deciding an azimuth angle of the touch object with respect to the sensing surface according to the electromagnetic wave signal;
 receiving a mechanical wave signal actively emitted from the touch object by the touch-sensing apparatus and deciding a distance of the touch object according to a time difference between time of receiving the mechanical wave signal and time of receiving the electromagnetic wave signal; and
 deciding the position of the touch object on the sensing surface according to the azimuth angle and the distance.

26. The method of claim 25, further comprising, before receiving the electromagnetic wave signal from the touch object by the touch-sensing apparatus:
 making the touch object emit a correction mechanical wave signal and a correction electromagnetic wave signal from each of two different positions on the sensing surface; and
 receiving the correction mechanical wave signal and the correction electromagnetic wave signal to correct the sensing surface.

27. The method of claim 25, further comprising, after receiving the electromagnetic wave signal from the touch object by the touch-sensing apparatus:
 comparing a time of the mechanical wave-receiving unit receiving the mechanical wave signal, and in the case that the time of the mechanical wave-receiving unit receiving the mechanical wave signal exceeds a determination time, the electromagnetic wave signal emitted by the touch object is received again.

28. The method of claim 27, further comprising, when the electromagnetic wave signal emitted by the touch object is received again:
 outputting and recording a no-touch point signal.

29. The method of claim 28, further comprising, after comparing the time of the mechanical wave-receiving unit receiving the mechanical wave signal:
 outputting and recording another no-touch point signal in the case that the time of the mechanical wave-receiving unit receiving the mechanical wave signal does not exceed the determination time and in the case that the previous no-touch point signal is detected and recorded.

30. The method of claim 25, further comprising, before the touch object emits the electromagnetic wave signal and the mechanical wave signal on the sensing surface:
 making the touch object emit a startup electromagnetic wave signal on the sensing surface; and
 switching the electromagnetic wave-receiving unit from a standby mode to a startup mode after receiving the startup electromagnetic wave signal, wherein a sampling frequency of the electromagnetic wave-receiving unit in the standby mode and a sampling frequency of the electromagnetic wave-receiving unit in the startup mode are different.

31. The method of claim 25, further comprising:
 the touch object emitting the mechanical wave signal and the electromagnetic wave signal in synchrony.

* * * * *